United States Patent [19]

Feke et al.

[11] Patent Number: 5,085,783
[45] Date of Patent: Feb. 4, 1992

[54] ACOUSTICALLY DRIVEN PARTICLE SEPARATION METHOD AND APPARATUS

[75] Inventors: Donald L. Feke, Chesterland; Thomas L. Tolt, North Olmsted, both of Ohio

[73] Assignee: Case Western Reserve University, Cleveland, Ohio

[21] Appl. No.: 568,604

[22] Filed: Aug. 16, 1990

[51] Int. Cl.⁵ .............................................. B01D 17/06
[52] U.S. Cl. ................................. 210/748; 210/243; 55/15; 55/277
[58] Field of Search ................. 210/748, 243; 55/15, 55/277

[56] References Cited

U.S. PATENT DOCUMENTS

| | | |
|---|---|---|
| 3,650,094 | 3/1972 | Goodwin . |
| 4,032,438 | 6/1977 | Koblanski . |
| 4,055,491 | 10/1977 | Porath-Furedi . |
| 4,076,617 | 2/1978 | Bybel et al. . |
| 4,126,547 | 11/1978 | Kuris . |
| 4,280,823 | 7/1981 | Szonntagh . |
| 4,475,921 | 10/1984 | Barmatz . |
| 4,523,682 | 6/1985 | Barmatz et al. . |
| 4,561,953 | 12/1985 | Muralidhara et al. . |
| 4,673,512 | 6/1987 | Schram . |
| 4,743,361 | 5/1988 | Schram . |
| 4,759,775 | 7/1988 | Peterson et al. . |

OTHER PUBLICATIONS

Ostergaard, *Technical Notes and Research Briefs*, 86 J. Acoustical Soc'y Am. 2461, 2461-62 (Dec. 1989).

Ward, *An Investigation of the Generation and Radiation of Aerodynamic Noise in Real Piping Systems*, iii-iv (Aug. 1989).

Tolt & Feke, *Analysis and Application of Acoustics to Suspension Processing*, (Jul. 31-Aug. 5, 1988).

Higashitani, Fukushima & Matsuno, *Migration of Suspended Particles in Plane Stationary Ultrasonic Field*, 36 Chem. Eng'g Sci. 1877 (1981).

Primary Examiner—Charles Hart
Attorney, Agent, or Firm—Fay, Sharpe, Beall, Fagan, Minnich & McKee

[57] ABSTRACT

A method for separating particles from a flowing fluid suspension comprises the steps of providing an elongated chamber having closed first and second ends, flowing into the elongated chamber a fluid medium in which particles to be separated are suspended, and propagating an acoustic wave through the flowing fluid medium in the chamber. The acoustic wave is directed generally along the length of the chamber and is varied in frequency within a desired frequency range including a frequency resonant to the chamber to produce stationary coincidence excitations that separate particles from the fluid medium and urges the separated particles toward the second end of the chamber. The method also includes the steps of removing the fluid medium from the first end of the chamber and removing from the chamber the particles urged toward the second end of the chamber. The apparatus for separating particles from a flowing fluid comprises a tube having first and second open ends, a first outlet port adjacent the first end, a second outlet port adjacent the second end, and an inlet port intermediate the first and second end. Each end of the tube is closed by a spacer bonded to the tube end. A transducer is bonded to each spacer.

18 Claims, 2 Drawing Sheets

1

ACOUSTICALLY DRIVEN PARTICLE SEPARATION METHOD AND APPARATUS

BACKGROUND OF THE INVENTION

The present invention relates to a method and apparatus for collecting, manipulating, or separating particles from a fluid suspension. In particular, the present invention relates to an acoustically driven method and apparatus for separating fine particles from a fluid suspension.

A variety of processes are used for separation of particles from fluid suspensions. None of the conventional separation processes, however, has proved practicable for separation of fine (on the order of 1 $\mu$m) particles. Conventional packed bed systems are subjected to prohibitively large pressure drops when processing fine particles. Mixer-settler contactors require extremely prolonged sedimentation steps when processing fine particles. Fluidized bed processes have proven unsuitable because fine particles are too susceptible to entrainment in the outflowing fluid. The efficiency of cyclone separation systems is too sensitive to particle size; for example, the optimum diameter of a cyclone processing 5 $\mu$m mineral particles suspended in water would be about 1 cm, which is impractical for processes of any significant scale.

Acoustic methods recently have shown promise for solving the problems of separating fine particles from fluid suspensions. Under appropriate conditions, a standing acoustic wave imposed on a fluid suspension containing fine particles will drive the particles to the nodes (positions of minimum range of acoustic pressure) and trap them there. An example of a separation method employing this principle is disclosed in U.S. Pat. No. 4,055,491, in which an ultrasonic generator is energized to set up a standing acoustic wave in a chamber containing blood and trap blood cells at the nodes of the standing wave. After the generator is de-activated, the blood cells settle downwardly in response to the acceleration of gravity to an outlet at the bottom of the chamber.

Although acoustic waves have been shown to be effective in trapping fine particles in a fluid suspension, the methods heretofore used for trapping and removing particles have not exhibited the speed desirable for large-scale commercial processing. For example, the blood cell-separation method of U.S. Pat. No. 4,055,491 requires energizing the ultrasonic generator for twenty seconds to trap the blood cells and de-energizing the generator for five seconds to permit the trapped particles to settle out of the space subjected to the acoustic field. For the successful commercial application of acoustically aided separation methods, it is desirable both to accelerate the trapping of particles and to provide a removal scheme that does not require de-energizing the acoustic field.

The present invention is intended to provide an acoustically driven particle separation method that quickly traps fine particles throughout a cell.

The present invention also is intended to provide an acoustically driven particle separation method that can trap and remove fine particles simultaneously, without de-energizing the acoustic field.

In addition, the present invention is intended to provide an acoustically driven apparatus that can trap and remove fine particles from a fluid suspension.

Additional advantages of the present invention will be set forth in part in the description that follows, and in part will be obvious from that description or can be learned by practice of the invention. The advantages of the invention can be realized and obtained by the method and apparatus particularly pointed out in the appended claims.

SUMMARY OF THE INVENTION

The present invention overcomes the problems of prior art fine-particle separation processes by employing a closed-end elongated chamber to hold a fluid medium and by imposing a range of resonant acoustical conditions on the chamber to produce coincidence excitation of the fluid and chamber. Specifically, the invention is operated by generating within the chamber acoustic waves that vary periodically in frequency over a range that includes a frequency resonant to the chamber.

To overcome the problems of the prior art particle separation methods, and in accordance with the purpose of the invention, as embodied and broadly described herein, the method of this invention for separating particles from a fluid suspension comprises the steps of providing an elongated chamber having closed ends, supplying the elongated chamber with a fluid medium in which particles to be separated are suspended, and propagating acoustic waves through the fluid medium in the chamber to urge particles toward one end of the chamber. The acoustic waves are directed generally along the length of the chamber and are varied in frequency within a desired frequency range including a nominal frequency resonant to the chamber. The method of the invention preferably includes the additional step of removing from the chamber the particles urged toward the one end of the chamber.

In accordance with another aspect of the invention, the apparatus of the invention is for separating particles from a flowing fluid and comprises a tube having first and second ends, driver means for generating acoustic waves within the tube, and reflector means for reflecting toward the first end of the tube the acoustic waves generated by the driver means. The tube has first and second open ends, a first outlet port adjacent the first end, a second outlet port adjacent the second end, and an inlet port intermediate the first and second ends. The driver means is fixed to and closes the first end of the tube, while the reflector means is fixed to and closes the second end of the tube. The apparatus also comprises means for driving the driver means to vibrate over a desired frequency range including a nominal frequency resonant to the tube closed by the driver means and reflector means. When a fluid medium containing particles to be separated is flowed into the tube through the inlet port, the vibration of the driver means over the desired frequency range propagates acoustic waves through the fluid medium to separate particles from the flowing fluid medium and to urge the separated particles toward the second end of the chamber, where the separated particles drop out of the tube through the second outlet port. The fluid medium flows out of the tube through the first outlet port. Each of the driver means and reflector means preferably includes a transducer bonded to a spacer, the spacer being bonded to the end of the tube.

The accompanying drawings, which are incorporated in and which constitute a part of this specification, illustrate at least one embodiment of the invention and, together with the description, explain the principles of the invention.

DESCRIPTION OF THE PREFERRED EMBODIMENTS

Reference now will be made in detail to the presently preferred embodiments of the invention, examples of which are illustrated in the accompanying drawings.

Figure 1:
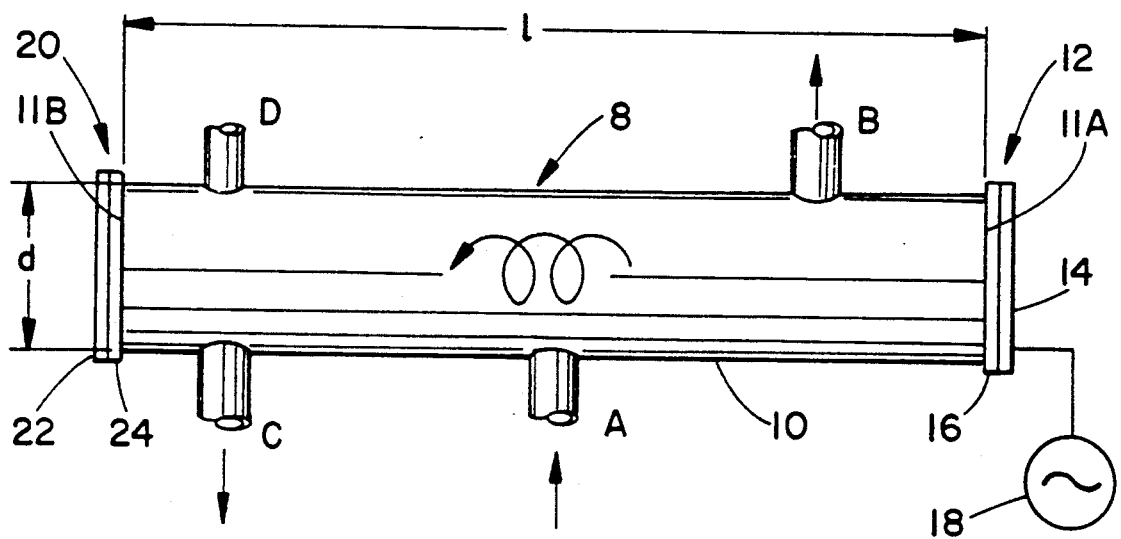
FIG. 1 is a side view of the apparatus of the invention as used to perform one embodiment of the method of the invention.

One embodiment of the apparatus of the present invention is shown in FIG. 1. The apparatus comprises tubular chamber 8, which includes a tube 10 of diameter d and length l with first and second open ends 11A and 11B. Open ends 11A and 11B preferably are polished. Chamber 8 also includes a plurality of ports formed in tube 10, namely, suspension inlet A located intermediate ends 11A and 11B, clarified fluid outlet B adjacent end 11A, and particle outlet C and flushing inlet/gas outlet port D adjacent end 11B.

In accordance with the invention, chamber 10 includes driver means for generating acoustic waves within tube 10. As embodied herein and as shown in FIG. 1, the driver means of the present invention includes driver end assembly 12, which is fixed to and closes first open end 11A of tube 10. Driver end assembly 12 includes first transducer 14 and first frequency-matching spacer 16, which are bonded together. Spacer 16 is bonded to first open end 11A of tube 10.

The apparatus of the invention also includes means for driving the driver means to vibrate over a desired frequency range to propagate acoustic waves within tube 10. As embodied herein, the means for driving the driver means includes signal generator 18, which is connected to first transducer 14.

In accordance with the invention, chamber 10 includes reflector means for reflecting toward first open end 11A the incident acoustic waves generated by the driver means. As embodied herein and as shown in FIG. 1, the reflector means of the present invention includes reflector end assembly 20, which is fixed to and closes second open end 11B of tube 10. Reflector end assembly 20 includes second transducer 22 and second frequency-matching spacer 24, which are bonded together. Spacer 24 is bonded to second open end 11B of tube 10.

Second transducer 22 preferably is acoustically equivalent to first transducer 14 to provide mirror-image reflections of incident acoustic waves generated by first transducer 14. Second transducer 22 can be connected to an oscilloscope or other monitoring device to assist in finding the coincident excitation frequencies discussed below.

Spacers 16 and 24 preferably are disk-shaped and comprised of the same material as tube 10. They should have a thickness approximately equal to one half the wavelength in the spacers at the transducers' fundamental frequency to provide vibration modes at multiples of one half the fundamental frequency as well as at multiples of the fundamental frequency.

As is well known in the art, if a fluid containing fine (on the order of 1 μm) particles is supplied into chamber 8, first transducer 14 can be driven to set up a standing resonant acoustic wave within chamber 8. Standing wave resonances are achieved when transmitted and reflected sound waves in fluids constructively superimpose. If first transducer 14 is driven at a constant frequency by signal generator 18 to generate an incident acoustic wave of a given amplitude, second transducer 22 will reflect an oppositely directed wave of equal amplitude. The frequency of standing resonant waves depends on the longitudinal speed of transmission of sound in the fluid and the path length of the sound and its reflection, which is set by the length of the chamber. When planar waves are propagated in the axial direction of an elongated chamber with rigid ends, such as chamber 8, the cell length must be an integral number of half wavelengths of the acoustic wave in the fluid.

The resulting acoustic pressure of the standing resonant wave will collect and trap the particles in discrete, thin zones along the longitudinal axis of chamber 8. These zones correspond to the pressure nodes of the standing wave and are separated by distances corresponding to one half the wavelength of the incident acoustic wave.

In standing wave or interference resonance, the transducer alone introduces acoustic energy to the fluid; the walls of the vessel do not participate to a large degree in these types of resonance. The method of the present invention, however, utilizes the response of the walls of tube 10 to vibrations in the fluid to generate very strong sound fields, which we refer to as "coincidence excitations."

As known to those of ordinary skill in the art, coincidence excitations are generated in very long vessels, such as pipes, when the transducer or other means generating the acoustic field is driven at a frequency such that waves in the fluid and waves in the wall of the vessel propagate with the same phase velocity and mode geometry. Normally, this phenomenon is to be avoided in piping systems because it results in strong, unwanted vibrations.

In the case of a finite vessel such as chamber 8, however, advantages can be obtained when excitation is provided such that the forward-traveling and backward-reflected coincident waves superimpose to produce stationary sound fields in both the chamber wall and fluid. From our experiments, we believe that coincidence excitation occurs when the sound waves in the fluid are coincident with bending waves in the walls of the chamber. The velocity of these bending waves depends primarily on the wall material and thickness. In coincidence excitation in a finite vessel containing particles suspended in a fluid, the walls of the vessel act in concert with the driving transducers to distribute the acoustic energy in the fluid, and particle collection occurs throughout the cross-section of the vessel.

To take advantage of the effect of coincidence excitation frequencies in a finite vessel, tube 10 preferably is comprised of a material having a small damping coefficient, such as borosilicate glass, although metals such as aluminum and ceramics (particularly useful for high-temperature applications) also are suitable materials. A tube comprised of a material having a high acoustic damping coefficient, such as acrylic, will not resonate as easily and exhibits decreased trapping capabilities.

The resonant frequencies of chamber 8 also depend, of course, on the geometry of the chamber. Consequently, transducers 14 and 22 should be selected from models having a fundamental frequency capable of matching a resonant frequency of the chamber, either directly or through frequency-matching spacers 16 and 24.

Figure 2:
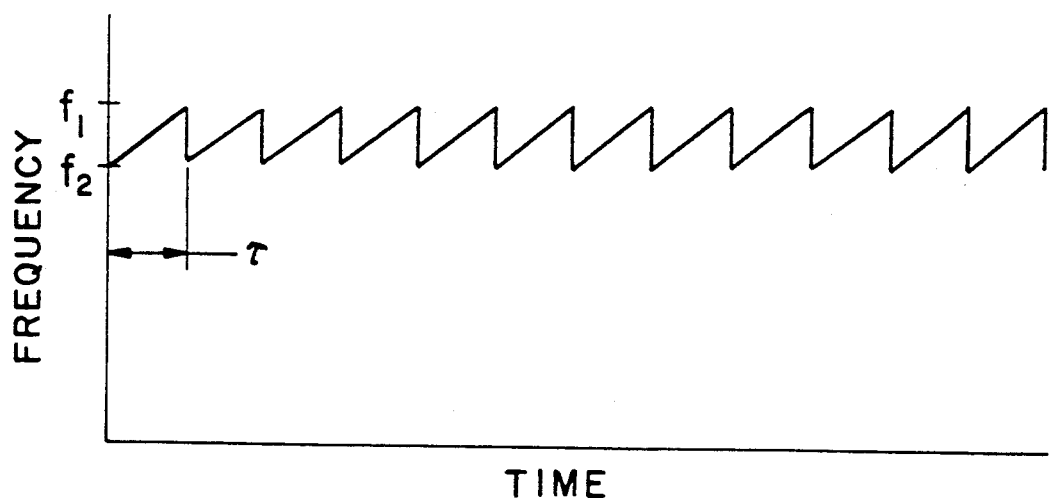
FIG. 2 is a diagram showing how the driving frequency is varied over time in accordance with one embodiment of the method of the invention.

In the first embodiment of the method of the present invention, the particle-containing fluid to be processed is supplied to chamber 8 through suspension inlet A, and signal generator 18 drives first transducer 14 to generate incident acoustic waves varying in frequency within a desired frequency range including a nominal frequency f, resonant to the chamber to take advantage of the coincidence excitation phenomenon. The frequencies of the incident waves preferably are ramped between $f_1$ and $f_2$ ($f_1 > f_r > f_2$) in accordance with a saw-tooth function of period $\tau$, as shown in FIG. 2. Of course, other saw-tooth functions, for example those having exponential or other non-linear ramps, can be used.

By ramping the frequency, the nodal positions, and the particles trapped at these locations by the coincidence excitations, can be moved along the length of the chamber. The location of the nodal positions will change with frequency because the delay time (phase shift) of reflected waves will change such that a standing wave is maintained even though the distance between the driver and reflector is not an integral multiple of one half the sound wavelength.

At a certain frequency difference the phase shift will be a full 360° and all nodal positions will be advanced by one half a wavelength distance away or toward the driving transducer for positive and negative frequency ramping, respectively. If p is the length of the cell divided by the wavelength at a first frequency $f_1$, and q is the cell length divided by the wavelength at a second frequency $f_2$, then the preferred frequency conditions, under which the nodal positions shift by a distance equal to an integer n multiplied by $\lambda/2$, can be derived as follows:

$$(f_1-f_2)L_z/c = p-q = n,$$

where $L_z$ is the length of the chamber, c is the velocity of sound in the fluid (equal to frequency f times wavelength $\lambda$ and temperature dependent), and n is an integer. If n is small, indicating a relatively narrow frequency range, the driving 20 frequencies more likely will be within the range of the vigorous frequency response of the chamber. Most preferably, $f_1$ and $f_2$ are set so n equals 1.

When first transducer 14 is operated to propagate acoustic waves along the length of chamber 8, with the frequency varying between $f_1$ and $f_2$ as defined above with n=1, particles entering chamber 8 through suspension inlet A are trapped quickly along the longitudinal axis of the chamber by the coincident resonant acoustic field and are moved toward reflector end assembly 20. The particles tend to move along a generally distorted path, as depicted by the helical arrow in FIG. 1. The fluid exiting chamber 8 via clarified fluid outlet B is substantially free of particles relative to the fluid supply to chamber 8.

We have noticed that coincidence excitations can be generated in cylindrical tubes that are not necessarily straight. In particular, the excitations continue to manifest themselves through the exit ports attached to the walls of the tubular chamber. Consequently, some of the particles transported to second end 11B continue to travel in a distorted path out of outlet C. For particles having densities greater than the host fluid, the exit through outlet C is aided by gravity. For particles having densities approaching that of the fluid, removal through outlet C can be aided by intermittently pumping host fluid into port D and out of outlet C. For removal of entrained particles of extremely low density, including gas bubbles, port D can operate as an outlet port.

The rate at which the transducer is swept in frequency, $(f_1-f_2)/\tau$, should not be so fast that it exceeds the response time of the vibrating transducers, in which case the nodes will jump back and forth with no net displacement. Slow ramping rates can be used to advance the nodes at a slow rate in the cell. Experimentally, ramping rates between 0.5 to 50 Hz/msec have been found to be effective.

The above-described method has been successful in separating particles ranging in size from 1 mm to 0.1 $\mu$m from an aqueous fluid medium. Polymer latex spheres, $Al_2O_3$ particles, and paper pulp have been acoustically trapped and swept from aqueous media. As those skilled in the art will understand, the method also can be used to separate one liquid suspended in another liquid, such as oil "particles" from water.

We have observed separated particle velocities greater than 1 cm/sec. The laws of fluid dynamics should place practical limits on the velocity that can be attained by increasing the ramping rate of the signal driving the transducer. In addition to considerations of viscous drag of the particles in the fluid medium, problems of inducing turbulence in the fluid arise at higher power levels.

To investigate further the coincidence excitation phenomenon, acoustic pressure measurements were taken using a 1 mm diameter calibrated piezoelectric hydrophone. For example, measurements were taken in the 2.5 cm diameter, 20 cm long glass chamber constructed in accordance with FIG. 1 but containing only distilled water. Coincidence excitation was found at a nominal frequency of 725 kHz. Stationary readings with the hydrophone inserted in the outlet port C of the cell showed the acoustic pressure to be relatively uniform across the diameter of the cell at this axial position. With the transducer driven at 16 watts, the acoustic pressure varied from 0.35 MPa near the bottom inside wall, to 0.7 MPa near the tube center, to 0.5 MPa in the interior of the outlet port. This uniformity of pressure allows for particle collection over a larger portion of the cell cross-section in comparison to the case of standing or interference fields, which tend to focus on the solids positioned along the center axis of the cell.

Another series of pressure measurements was made at a fixed point near the cell axis when the frequency was swept between 720 and 727 kHz. Even though the chamber remained in coincidence excitation with the internal sound field at all of these frequencies, the pressure at the fixed location ranged from 0.3 to 0.7 MPa corresponding to variations in driving power of 25 to 40 watts. This indicates that the acoustic pressure is highest at a frequency that is more resonant, thereby allowing more power into the system.

Finally, hydrophone measurements showed that the acoustic pressure in the chamber when it is operated in a coincident or in a non-coincident mode tends to reach a maximum value as the electrical power is increased. At the maximum power level, the acoustic pressure in the coincident resonance was found to be only a factor of 1.4 higher than the other modes of operation. In the non-coincident modes, however, the high nonuniformity of the acoustic field, manifested by high pressures only along the center axis, results in unnecessary electrical power consumption, fluid streaming, and heating of the system. In coincidence resonance, a higher fraction of the energy supplied to the cell actually goes toward particle collection.

Figure 3:
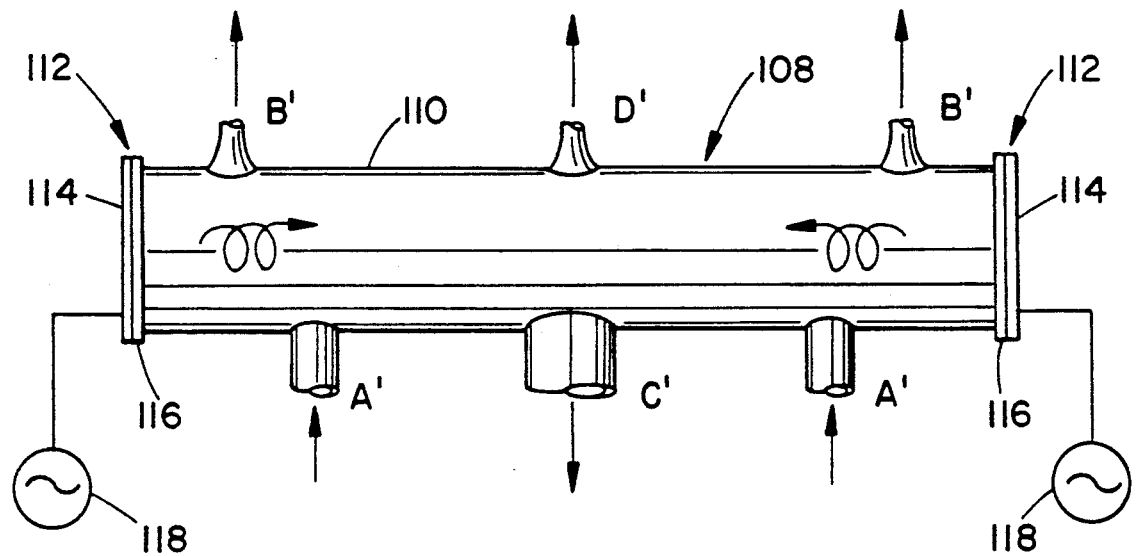
FIG. 3 is a side view of an alternative apparatus of the invention as used to perform an alternative embodiment of the method of the invention.

FIG. 3 illustrates an apparatus for performing a second embodiment of the method of the invention. This apparatus comprises tubular chamber 108, which includes an open-ended tube 110 having a plurality of ports formed therein. These ports include a pair of suspension inlets A' spaced from the longitudinal ends of tube 110, a pair of clarified fluid outlets B' diametrically opposed from inlets A' and adjacent the ends of tube 110, particle outlet C' positioned axially between inlets A', and gas outlet port D' diametrically opposed from outlet C'.

In accordance with the invention, chamber 108 includes first and second driver means for generating axially opposed acoustic waves within tube 110. As embodied herein and as shown in FIG. 2, the first and second driver means of the second embodiment of the invention includes a pair of driver end assemblies 112, each of which is fixed to and closes an open end of tube 110. Each driver end assembly 112 includes transducer 114 and frequency-matching spacer 116 bonded between transducer 114 and the respective end of tube 110.

The apparatus of the second embodiment of the invention also includes means for driving the first and second driver means to vibrate over a desired frequency range to propagate axially opposed acoustic waves within tube 110. As embodied herein, the means for driving the driver means includes a pair of signal generators 118, each of which is connected to a transducer 114. Alternatively, a single signal generator can be used to drive transducers 114 in parallel.

With continued reference to FIG. 3, in the second embodiment of the method of the invention, the particle-containing fluid to be processed is supplied to chamber 108 through suspension inlets A', and signal generators 118 drive transducers 114 to generate axially opposed incident acoustic waves each varying in frequency within a desired frequency range including a nominal frequency resonant to the chamber to obtain the coincidence excitation phenomenon described above. The incident waves preferably are mirror images of one another, with frequency varying in accordance with a saw-tooth function such as that shown in FIG. 2.

When transducers 114 are so operated, particles entering chamber 108 through suspension inlets A' are trapped quickly along the longitudinal axis of the chamber by the coincident resonant acoustic fields and are moved along distorted paths toward the axial center of the chamber, where relatively dense particles drop out of chamber 108 through outlet C'. Gas bubbles entrained by the acoustic fields can be removed through outlet D'. The fluid exiting chamber 108 via clarified fluid outlets B' is substantially free of particles relative to the fluid supply to chamber 108.

Although in the second embodiment of the method of the invention the axially opposed transducers are driven to produce mirror-image acoustic waves, opposed incident waves of differing frequency functions and amplitudes can be employed. For example, frequency ranges encompassing two different resonant frequencies of the chamber will cause particles to be trapped at nodes that correspond to the combination of the positions expected from the individual generated acoustic fields. In addition, while the frequency of one transducer is ramped to produce coincidence excitations for separation of particles from the fluid, the other transducer can be operated to produce a cavitation field to enhance liberation of extracted phases from the particles by the host fluid.

In this latter case, host fluid and particles containing extractable phases are introduced into chamber 8 of FIG. 1 through port A. The coincidence excitations generated by first transducer 14 trap the particles and transport them toward second transducer 22. Second transducer 22, driven by a second signal generator (not shown) to produce a cavitation field within the chamber, agitates the particles in the host fluid to liberate the extractable phases, which remain entrained in the host fluid. The host fluid and extracted phases exit chamber 8 through port B, while the spent particles are withdrawn through port C. The frequencies necessary to produce cavitation can easily be determined for a given chamber configuration.

Figure 4:
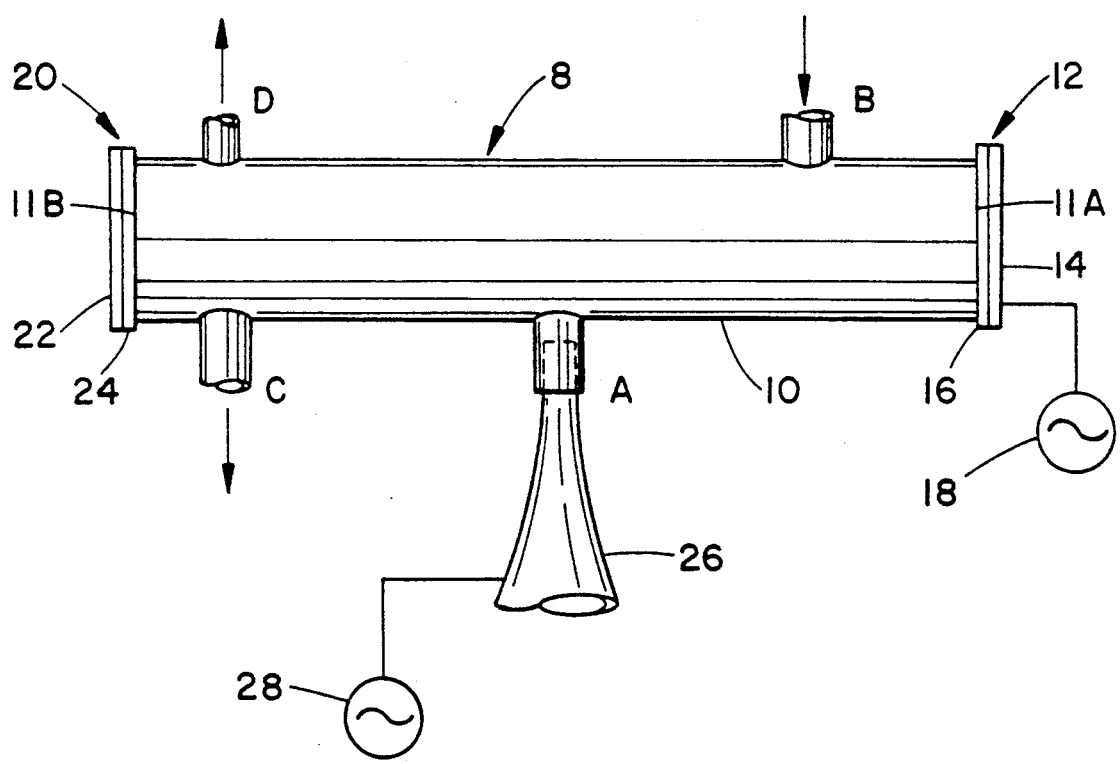
FIG. 4 is a side view of another alternative apparatus of the invention as used to perform another alternative embodiment of the method of the invention.

An alternative apparatus for separating extractable phases from particles suspended in a fluid medium is shown in FIG. 4, in which elements corresponding to the elements of the apparatus of FIG. 1 are designated by identical reference numerals. In the apparatus of FIG. 4, cavitation is induced by amplification horn 26 inserted into and sealed to port A. The host fluid and particles including extractable phases are fed into chamber 8 through port B, and signal generator 18 drives first transducer 14 as described with reference to the first embodiment of the method of the invention to produce resonance excitations that separate particles from the host fluid and urge them toward reflector end assembly 20. Amplification horn 26 is driven by signal generator 28 at a frequency to produce a cavitation field at the longitudinal center of the chamber. The cavitation field agitates the particles in the host fluid to liberate the extractable phases, which remain entrained in the host fluid. The host fluid and extracted phases exit chamber 8 through port D, while the spent particles are withdrawn through port C.

For certain extractable phases, of course, the mere trapping of particles in a flowing fluid medium is sufficient for extraction without having to resort to inducing a cavitation field. In addition, this extraction concept can be used for fluid purification or catalyst reactions in which the fluid contains the phase to be extracted by contact with solid particles, such as activated carbon or gaseous bubbles.

The invention is illustrated further by the following examples.

EXAMPLE 1

Particle Separation by Coincidence Excitation in a Stationary Field

Experiments were conducted using an apparatus similar to that shown in FIG. 1 to demonstrate the trapping effect of the coincident resonant frequency phenomenon. The tubular chamber comprised a 12.7 cm long borosilicate glass tube with an outer diameter of 2.7 cm and a wall thickness of 1.6 mm. The ends of the tube were polished. A disc-shaped transducer of lead zirconate-lead titanate was attached to each end of the tube. The transducers were of composition-type 5802 (Channel Industries, Inc., Cleveland, Ohio), each having a diameter of 2.7 cm and a thickness of 1.5 mm. This composition generally is used in ultrasonic drivers for high-power applications. Thin circular silver electrodes 1.6 cm in diameter were present on each face of the transducer. The nominal fundamental thickness resonant frequency of the transducer is 1.35 mHz.

The transducers were bonded to glass frequency-matching spacers having a thickness of 2.16 mm, which were then bonded with an epoxy (Armstrong A-271) directly to the ends of the tube. The transducer-glass assembly functioned as a two-layer quarter wavelength sandwich transducer at a nominal frequency of 620 kHz with a larger band width than at the fundamental resonance frequency. The chambers used in these experiments had only two ports, one near each end of the tube.

A General Radio bridge oscillator (model 1330A) was used to produce a continuous sinusoidal signal to one of the transducers. Amplification was provided with ENI radio frequency amplifiers (models 240L and 2100L). A Bird wattmeter (model 4410A) was used to measure forward and reflected electrical power between the amplifier and the transducers. Frequency was measured with a HP Universal counter and the voltage across the electrodes of the transducer was monitored on an oscilloscope.

The chamber was supplied with a slurry of $Al_2O_3$ in an aqueous-based electrolyte. The solids content was 1-2% by weight, and the mean particle size was 8 $\mu$m. The slurry was pumped into the chamber at a flow rate up to 10 ml/min with a peristaltic pump, and one transducer was driven at 10 watts with a 120 volt a.c. peak signal. The second transducer was used as a receiver, and its output was monitored on an oscilloscope as an aid in finding the strong coincidence excitation frequency.

The flow rate was limited not by the speed at which the particles were captured but by the change in temperature when large amounts of cooler fluid entered the chamber. The introduction of cooler fluid changes the sound velocity in the fluid and tube walls and disrupts the resonant condition. A strong coincident resonant frequency was found at 645 kHz.

After strong resonance was established and a steady-state temperature was reached, the feed slurry was circulated into the chamber while holding the driving frequency at 645 kHz. The particles were immediately distributed by acoustic radiation pressure to the antinodal positions of the stationary wave. The effluent was continuously removed from the chamber, and operation continued until the capacity of the acoustic field to hold particles was reached.

The acoustic field was then turned off and the solids and excess fluid were pumped out of the chamber. The effluent from the chamber was collected and examined by gravimetric analysis. The results showed that 90-95% of the inorganic solid was captured and retained in the chamber. The retention of the host fluid in the chamber accounted for 60-65% of the total electrolyte treated. It was noted that the particles showed significant agglomeration and fell immediately to the bottom of the tube when the acoustic field was turned off.

EXAMPLE 2

Particle Separation by Coincidence Excitation with Ramped Driving Frequencies

Further experiments were conducted with an apparatus substantially the same as that used in Example 1, except that the chamber used was 20 cm long with an outer diameter of 2.5 cm. In this case, the signal driving the transducer was provided by a Krohn-Hite function generator (model 2100A).

The driving transducer was driven continuously with 10 watts by a continuous sinusoidal signal which was swept upwardly in frequency according to a saw-tooth function from 610 kHz to 615 kHz with a period of 0.14 sec. A slurry of 12 $\mu$m $Al_2O_3$ particles in an aqueous carrier was pumped into the chamber through the port adjacent the driving transducer. The majority of particles were immediately trapped and carried to the reflector end of the tube along a distorted path centered about the axis of the tube. The velocities of the zones in the axial direction ranged from approximately 1 cm/sec in the front half of the cell to zero near the reflecting transducer. It was noted that, as the amount of solid collected exceeded the capacity of the stationary pressure zones near the reflector end, the particles fell out of the sound field in weakly agglomerated

EXAMPLE 3

Particle Separation and Removal by Coincidence Excitation with Ramped Driving Frequencies Further experiments were conducted with an apparatus as shown in FIG. 1, including ports C and D. As used in the experiments given in this example, port D served as an inlet for a secondary pump that was used intermittently to create a low velocity cross flow adjacent end assembly 20 of the chamber to assist in the removal of agglomerated particles having densities close to that of the host fluid. The chamber dimensions and acoustic driving components were the same as those used in Example 2.

In these experiments, an inorganic solid with an average primary particle size of 9 $\mu$m in an aqueous based electrolyte was used as the feed. The first separation experiment utilized a suspension containing 0.003 g/ml (0.27 wt. %) solids. This suspension was heated to 60° C. and was fed into the chamber. The driving transducer was driven at 14 watts with the frequency ramped upwardly in accordance with a sawtooth function between 625 kHz and 630 kHz with a ramp rate of 35 Hz/msec. The volumetric flow rate of the feed suspension was varied between 3 and 15 ml/min, averaging 3.6 ml/min over the course of the experiment. After 175 ml of effluent was collected, gravimetric analysis showed the effluent to be 97.5% free of solid. Solid having a mass of 0.5 g was removed from the chamber through port C assisted by intermittent flow pulses and collected in a secondary pump circuit.

A second separation run using a feed suspension with a solids content of 0.0015 g/ml was undertaken. The driving transducer was driven at 12 watts with the frequency ramped upwardly in accordance with a sawtooth function between 645 kHz and 652 kHz with ramp rates of either 17.5 or 35 Hz/msec. The slower ramping rate resulted in an increase in the rate at which solids brought to the accumulation end of the tube exited the cell, but at the expense of a decrease in the velocity of the trapped zones at the opposite end. Consequently, the ramp rate was alternated every few minutes during the course of the experiment. The average volumetric flow rate was 4.7 ml/min and the experiment was ended after 200 ml of the suspension were treated. Gravimetric analysis showed that 81.7% by weight of the solids were removed.

The effluent collected in the experiment described in the previous paragraph was run through the cell an additional time at the same frequency and power conditions as before, but with a higher pumping speed. A volume of 175 ml of this mixture was treated with a volumetric flow rate of 12 ml/min. Gravimetric analysis showed that an additional 30% by weight of the solids were removed during this pass.

Example 4

Operation with Aluminum Acoustic Cells

A chamber comprising of an aluminum tube (2.5 cm diameter, 20 cm long, wall thickness 0.89 mm), fitted with identical transducers at both ends, was built and operated. Two 2 mm diameter ports were attached to holes drilled through the tube walls at locations approximately 2 cm from either end. A third similar port was located at the longitudinal center.

Utilizing one transducer as a driver, and the second as a receiver, a strong resonance response of the cell was seen between 618 and 634 kHz, similar to the response of a glass cell. In this separation experiment, 12 $\mu$m $Al_2O_3$ particles were introduced into the chamber as the driving transducer was driven at 22 watts with the frequency ramped upwardly between 622 kHz and 628 kHz in accordance with a saw-tooth function having a period of 140 msec. Even with no fluid flow into or out of the cell, large amounts of the particles were agglomerated by the acoustic field and were found to exit the cell through the port nearest the reflecting end of the chamber. When more suspension of these particles was fed to cell through the center port with a peristaltic pump, the effluent from the cell at the opposite end of the tube was mostly free from particles.

It will be apparent to those skilled in the art that other modifications and variations can be made in the method of the invention without departing from the scope of the invention. The invention in its broader aspects is, therefore, not limited to the specific details and illustrated examples shown and described. Accordingly, it is intended that the present invention cover such modifications and variations provided that they fall within the scope of the appended claims and their equivalents.

What is claimed is:

1. A method for separating particles from a fluid suspension, comprising the steps of:
   a. providing an elongated chamber having closed ends;
   b. supplying the elongated chamber with a fluid medium in which particles to be separated are suspended; and
   c. propagating acoustic waves through the fluid medium in the chamber, the acoustic waves being directed generally along the length of the chamber and being varied in frequency within a desired frequency range including a nominal frequency resonant to the chamber, to urge particles toward one end of the chamber.

2. The method of claim 1, wherein the frequency of the acoustic waves is varied by periodically increasing the frequency 1 from a minimum value $f_2$ to a maximum value $f_1$ within the desired frequency range in accordance with a saw-tooth function.

3. The method of claim 2, wherein said maximum and minimum frequency values $f_1$ and $f_2$ satisfy the following equation:

$$(f_1 - f_2)L_z/c = n,$$

where $L_z$ is the length of said chamber, c is the velocity of sound in the fluid, and n is an integer.

4. The method of claim 3, wherein n equals 1.

5. The method of claim 2, wherein the frequency of the acoustic waves is increased at a rate of 0.5 to 50 Hz/msec.

6. A method for separating particles from a fluid suspension, comprising the steps of:
   a. providing an elongated chamber having closed ends;
   b. supplying the elongated chamber with a fluid medium in which particles to be separated are suspended;
   c. propagating acoustic waves through the fluid medium in the chamber, the acoustic waves being directed generally along the length of the chamber and being varied in frequency within a desired frequency range including a nominal frequency resonant to the chamber, to urge particles toward one end of the chamber; and
   d. removing from the chamber the particles urged toward the one end of the chamber.

7. A method for separating particles from a flowing fluid suspension, comprising the steps of:
   a. providing an elongated chamber having closed first and second ends;
   b. flowing into the elongated chamber a fluid medium in which particles to be separated are suspended;
   c. propagating acoustic waves through the flowing fluid medium in the chamber, the acoustic waves being directed generally along the length of the chamber and being varied in frequency within a desired frequency range including a nominal frequency resonant to the chamber, to separate particles from the flowing fluid medium and to urge the separated particles toward the second end of the chamber; and
   d. removing the fluid medium from the first end of the chamber.

8. The method of claim 7, further comprising the step of removing from the chamber the particles urged toward the second end of the chamber.

9. A method for separating particles from a flowing fluid suspension, comprising the steps of:
   a. providing an elongated chamber having closed first and second ends;
   b. flowing into the elongated chamber adjacent each end thereof a fluid medium in which particles to be separated are suspended;
   c. propagating axially opposed acoustic waves through the flowing fluid medium in the chamber, the acoustic waves being directed generally along the length of the chamber from each end thereof and being varied in frequency within a desired frequency range including a nominal frequency resonant to the chamber, to separate particles from the flowing fluid medium and to urge the separated particles toward the longitudinal center of the chamber;

d. removing the fluid medium from each end of the chamber; and e. removing from the chamber the particles urged toward the longitudinal center of the chamber.

10. The method of claim 9, wherein the opposed acoustic waves are substantially equal in amplitude and frequency.

11. A method for separating extractable phases from particles suspended in a flowing fluid, comprising the steps of:

a. providing an elongated chamber having closed first and second ends;

b. flowing into the elongated chamber adjacent the first end thereof a fluid medium in which particles including extractable phases are suspended;

c. propagating acoustic waves through the flowing fluid medium in the chamber, the acoustic waves being directed generally along the length of the chamber from the first end to the second end thereof and being varied in frequency within a desired frequency range including a nominal frequency resonant to the chamber, to separate particles from the flowing fluid medium and to urge the separated particles toward the second end of the chamber, the flowing fluid medium separating extractable phases from the separated particles, the separated extractable phases remaining entrained in the fluid medium;

d. removing the fluid medium and entrained extractable phases from the chamber; and e. removing from the chamber the particles urged toward the second end of the chamber.

12. The method of claim 11, further comprising the step of producing a cavitation field within the chamber to assist the fluid medium in separating the extractable phases from the particles.

13. A method for separating extractable phases from particles suspended in a flowing fluid, comprising the steps of:

a. providing an elongated chamber having closed first and second ends;

b. flowing into the elongated chamber adjacent the first end thereof a fluid medium in which particles including extractable phases are suspended;

c. propagating first acoustic waves through the flowing fluid medium in the chamber, the first acoustic waves being directed generally along the length of the chamber from the first end to the second end thereof and being varied in frequency resonant to the chamber, to separate particles from the flowing fluid medium and to urge the separated particles toward the second end of the chamber, the flowing fluid medium separating extractable phases from the separated particles, the separated extractable phases remaining entrained in the fluid medium;

d. propragating second acoustic waves through the flowing fluid medium in the chamber, the second acoustic waves being directed generally along the length of the chamber from the second end to the first end thereof, the frequency of the second acoustic waves being selected to produce a cavitation field within the chamber to assist in separating extractable phases from the particles;

e. removing the fluid medium and entrained extractable phases from the chamber; and f. removing from the chamber the particles urged toward the second end of the chamber.

14. A method for separating extractable phases from a flowing fluid, comprising the steps of:

a. providing an elongated chamber having closed first and second ends;

b. flowing into the elongated chamber adjacent the first end thereof a fluid medium including extractable phases and suspended particles capable of separating the extractable phases from the fluid medium by contact with the extractable phases;

c. propagating acoustic waves through the flowing fluid medium in the chamber, the acoustic waves being directed generally along the length of the chamber from the first end to the second end thereof and being varied in frequency within a desired frequency range including a nominal frequency resonant to the chamber, to separate particles from the flowing fluid medium and to urge the separated particles toward the second end of the chamber, the separated particles separating extractable phases from the fluid medium flowing past the separated particles, the separated extractable phases remaining trapped in contact with the separated particles;

d. removing the fluid medium from the chamber; and e. removing from the chamber the particles and trapped extractable phases urged toward the second end of the chamber.

15. An apparatus for separating particles from a flowing fluid, comprising:

a. a tube having first and second open ends, a first outlet port adjacent said first end, a second outlet port adjacent said second end, and an inlet port intermediate said first and second end;

b. driver means for generating acoustic waves within said tube, said driver means being fixed to and closing said first end of said tube;

c. reflector means for reflecting toward said first end of said tube acoustic waves generated by said driver means, said reflector means being fixed to and closing said second end of said tube; and d. means for driving said driver means to vibrate over a desired frequency range including a frequency resonant to said tube closed by said driver means and reflector means, whereby when a fluid medium containing particles to be separated is flowed into said tube through said inlet port said vibration of said driver means over said desired frequency range propagates acoustic waves through the fluid medium to separate particles from the flowing fluid medium and to urge the separated particles toward the second end of the chamber where the separated particles exit said tube through said second outlet port, the fluid medium flowing out of said tube through said first outlet port.

16. The apparatus of claim 15, wherein:

said driver means includes a first transducer bonded to a first spacer, said spacer being bonded to said first end of said tube; and said reflector means includes a second transducer bonded to a second spacer, said spacer being bonded to said second end of said tube.

17. The apparatus of claim 16, wherein:

each of said first and second transducers operates at a fundamental frequency equal to approximately twice the frequency resonant to said closed tube; and each of said first and second spacers has a thickness equal to approximately one half the wavelength of the fundamental frequency of said first and second transducers.

18. An apparatus for separating particles from a flowing fluid, comprising:
a. a tube having first and second open ends, a pair of first outlet ports each spaced from one of said ends, a second outlet port intermediate said first outlet ports; and a pair of inlet ports each adjacent one of said ends;
b. first and second driver means for generating axially opposed incident acoustic waves within said tube, said first and second driver means being fixed to and closing said first and second ends of said tube, respectively; and
c. means for driving said first and second driver means to vibrate over a desired frequency range including a frequency resonant to said tube closed by said first and second driver means, whereby when a fluid medium containing particles to be separated is flowed into said tube through said first inlet ports said vibration of said first and second driver means over said desired frequency range produces axially opposed incident acoustic waves through the fluid medium to separate particles from the flowing fluid medium and to urge the separated particles toward the longitudinal center of the chamber where the separated particles exit said tube through said second outlet port, the fluid medium flowing out of said tube through said first outlet ports.

* * * * *